United States Patent Office 3,473,122
Patented Oct. 14, 1969

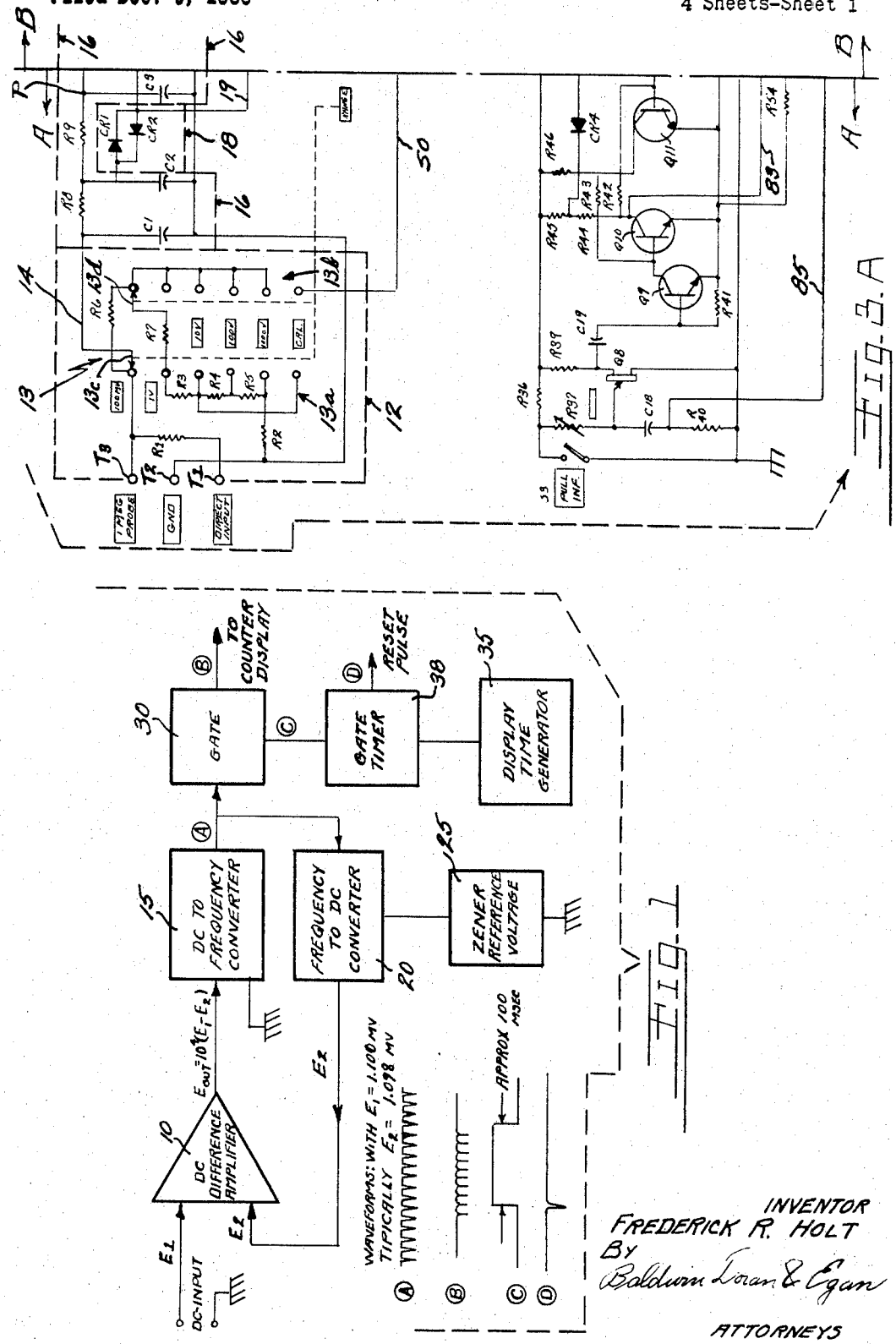

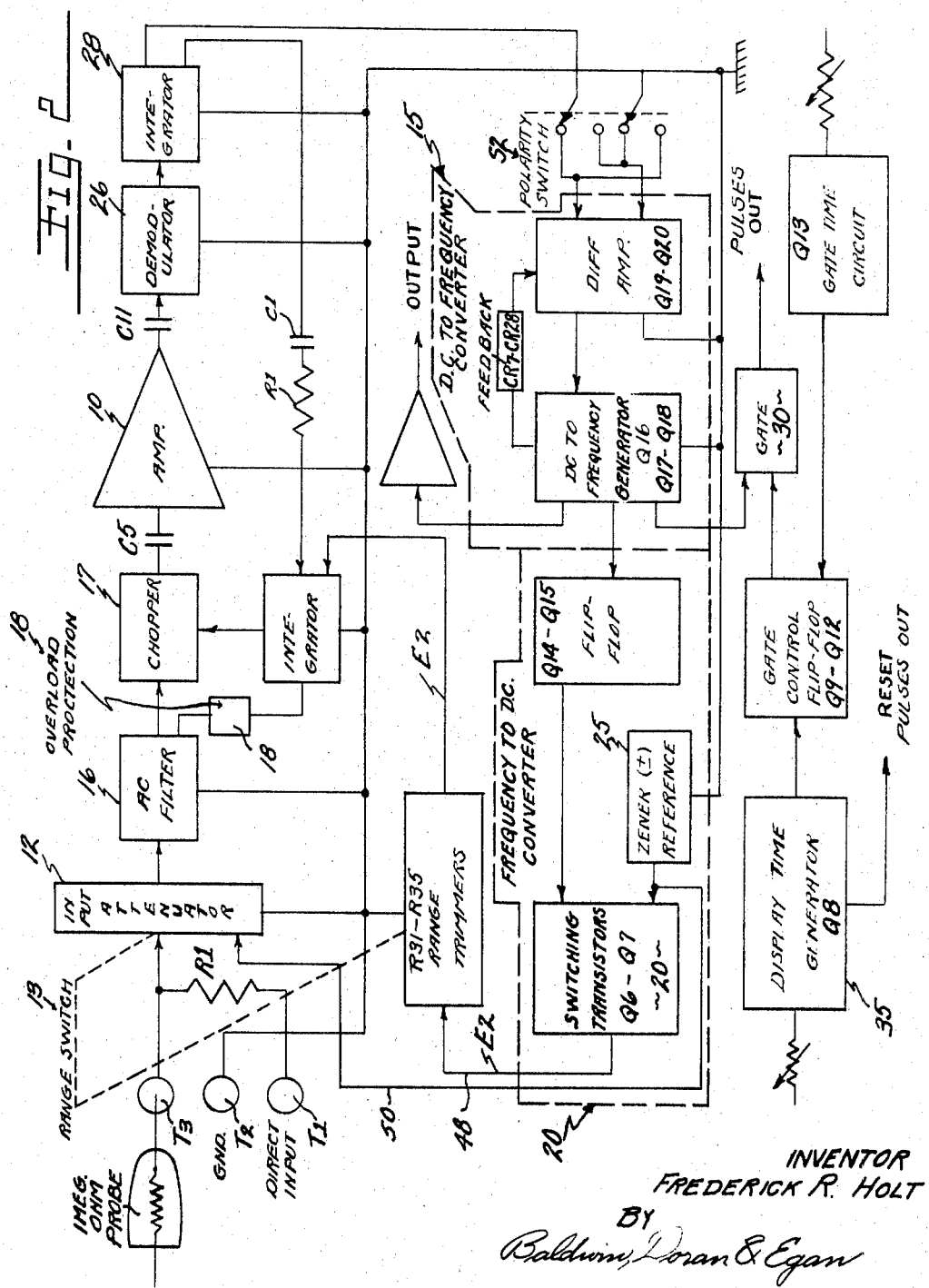

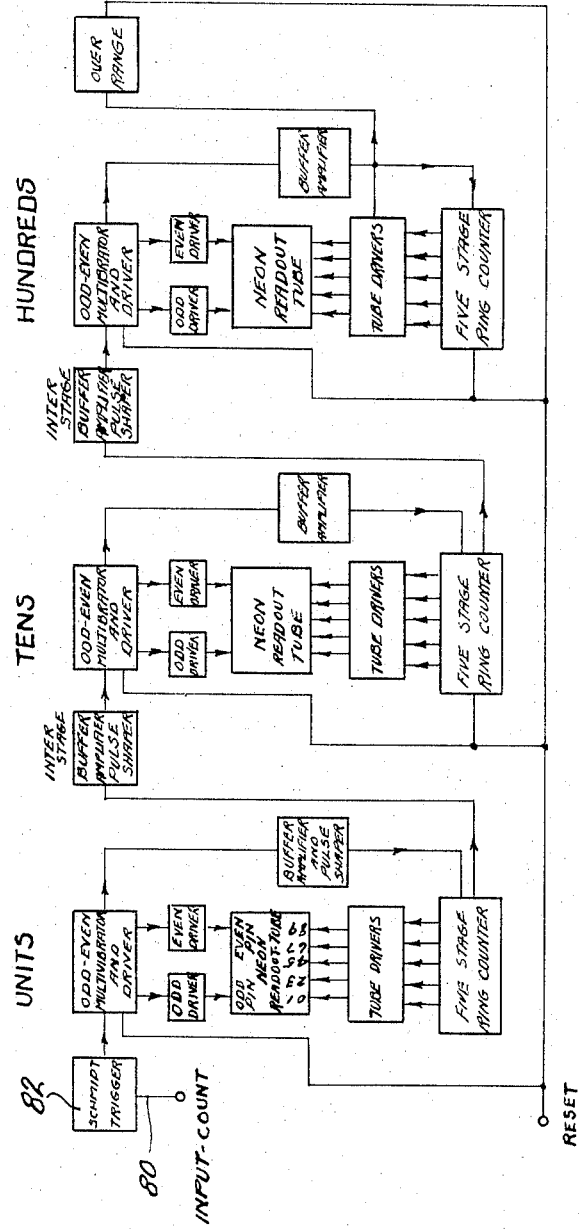

3,473,122
DIGITAL VOLTMETER
Frederick R. Holt, East Cleveland, Ohio, assignor to The Hickok Electrical Instrument Company, Cleveland, Ohio, a corporation of Ohio
Filed Dec. 5, 1966, Ser. No. 599,062
Int. Cl. G01r *17/06*
U.S. Cl. 324—99        5 Claims

ABSTRACT OF THE DISCLOSURE

The digital voltmeter converts a direct current input voltage into a burst of pulses wherein the number of pulses in the burst is precisely equal to the magnitude of the input voltage. A change in input voltage changes the number of pulses in the burst, but not the duration of the burst. The pulse burst may then be applied to a counter and display instrument wherein the same is visually digitally displayed. Each burst is preceded by a reset pulse which assures that the totalization of each count in the counter and display instrument starts from zero. The displayed total, is retained for a period of time controlled by a display time generator.

---

The direct current inplt voltage is $E_1$. A direct current feedback voltage of the same polarity as $E_1$ is applied to the input of the circuit in opposition to the voltage $E_1$. The difference voltage, $E_1-E_2$ is amplified and fed to the input of a direct current-to-frequency converter. This circuit generates a pulse train whose frequency is approximately proportional to voltage fed to it. This pulse is used to activate a highly precise frequency to direct current converter. The output of the frequency to direct current converter is $E_2$. $E_2$ is proportional to the product of a Zener reference voltage and the frequency of the pulse train within about ±0.01%. By making the gain of the difference amplifier very high, $E_2$ will be very nearly equal to $E_1$ and consequently, the frequency of the pulse train will be held proportional to $E_1$ to within a few parts in ten thousand.

The pulse burst having the correct number of pulses is obtained by opening a gate circuit for a carefully controlled time. By keeping this gate time constant, the numer of pulses in a burst will be directly proportional to the frequency of the pulse train, which in turn is directly proportional to the voltage $E_1$. Thus, the displayed total will be precisely proportional to the input direct current voltage $E_1$ under test.

Heretofore, the conventional type of electronic instrument for measuring voltage has utilized what is commonly referred to as a "d'Arsonval meter principle."

As is well known, this principle incorporates basically the suspension of a coil of wire or the equivalent in a magnetic field and applying the voltage to be measured to the coil causing a current flow therethrough which results in deflecting the coil proportionately to the magnitude of the applied voltage. A similar principle of operation is employed when measuring electrical current or pressure. A pointer or the like, which is attached to and movable with the coil passes over a suitable marked scale and the movement of said pointer is hence visually indicated on the latter to indicate the magnitude of the electrical parameter being measured. As is likewise well known in the art, this prior type of instrument, the principle of which has also been defined as analog, is generally inadequate to obtain an accurate measurement of electrical parameters such as voltage and/or current and consequently is somewhat limited in its utility.

As heretofore mentioned, the electronic circuit assembly of the present invention is particularly applicable for use in a digital measuring system to provide an exact numeral measurement of direct current voltages.

As merely one application the electronic circuit of the present invention is particularly applicable for use with the digital counter and readout unit commercially known as the Hickok Model DMS-3200 Main Frame which is manufactured by The Hickok Electrical Instrument Company of Cleveland, Ohio.

When used with this counter and readout unit or equivalent, the electronic circuit of the present invention is operable to convert a direct current voltage of unknown value into a pulse train or burst wherein the number of pulses in the burst is precisely equal to the magnitude of the unknown voltage. This pulse burst is then applied to the digital counter and readout device which counts the number of pulses and visually displays the numeral summation thereof to three decimal places thus giving a highly accurate visual display of the actual value of magnitude of the direct current voltage under test.

In its present day use, the instant electronic circuit as incorporated into a digital voltmeter is capable of providing a digital relationship for direct current voltages within the range of 0 volts to 1000 volts within an accuracy of 0.1% including effects of ambient temperature changes, line voltage variations and line frequences between 47 c.p.s. to 400 c.p.s.

In this present day application it is believed that the electronic circuit hereof is approximately 5 to 10 times bettter than the best of conventional moving pointer meters in determining direct current voltage parameters.

It is therefore a primary object of the present invention to provide an electronic instrument circuit which only the application thereto of a direct current voltage of unknown magnitude, is capable of generating a digital signal that is precisely equal to the magnitude of said voltage.

Another object of the present invention is to provide an electronic circuit especially designed to convert a direct current voltage of unknown magnitude into a burst of pulses wherein the number of pulses in the burst is precisely equal to the magnitude of the said direct current voltage.

Still another object of the present invention is to provide an electronic instrument circuit which is especially designed to provide an output digital signal that is precisely equal to the magnitude of a direct current voltage applied thereto and which circuit includes a direct current-to-frequency converter that generates a pulse train whose frequency is approximately proportional to the magnitude of voltage applied thereto, a highly precise frequency-to-direct current converter coupled to said direct current-to-frequency converter and whose output is proportional to the product of a predetermined reference voltage and the frequency of the signal applied thereto, a difference amplifier which is coupled to the input voltage under test and the output of the frequency-to-direct current converter; the gain of the amplifier being very high and coupled to said direct current-to-frequency converter whereby the output of the frequency-to-direct current converter is very nearly equal to the input voltage under test whereby to result in the frequency of the pulse train being held proportional to the said input voltage to within a few parts in ten thousand.

Other objects and advantages of the electronic digital circuit of the present invention will be apparent to one skilled in the art to which it pertains and upon reference to the following description of a preferred embodiment thereof and which is illustrated in the accompanying drawings wherein:

FIGURE 1 is a simplified block diagram of the digital electronic circuit of the present invention and also illustrating the several signal waveforms which appear at the various portions of said circuit;

FIGURE 2 is a block diagram of the complete circuit incorporated in the digital electronic circuit of the present invention;

FIGURES 3A and 3B are schematic wiring diagrams of the complete digital electronic circuit shown in FIGURE 2; and FIGURE 4 is a schematic diagram of the Hickok counter and readout device Model DMS-3200 to which the digital electronic circuit of the present invention may be connected to effect a digital visual display of a direct current voltage.

Figure 3B:
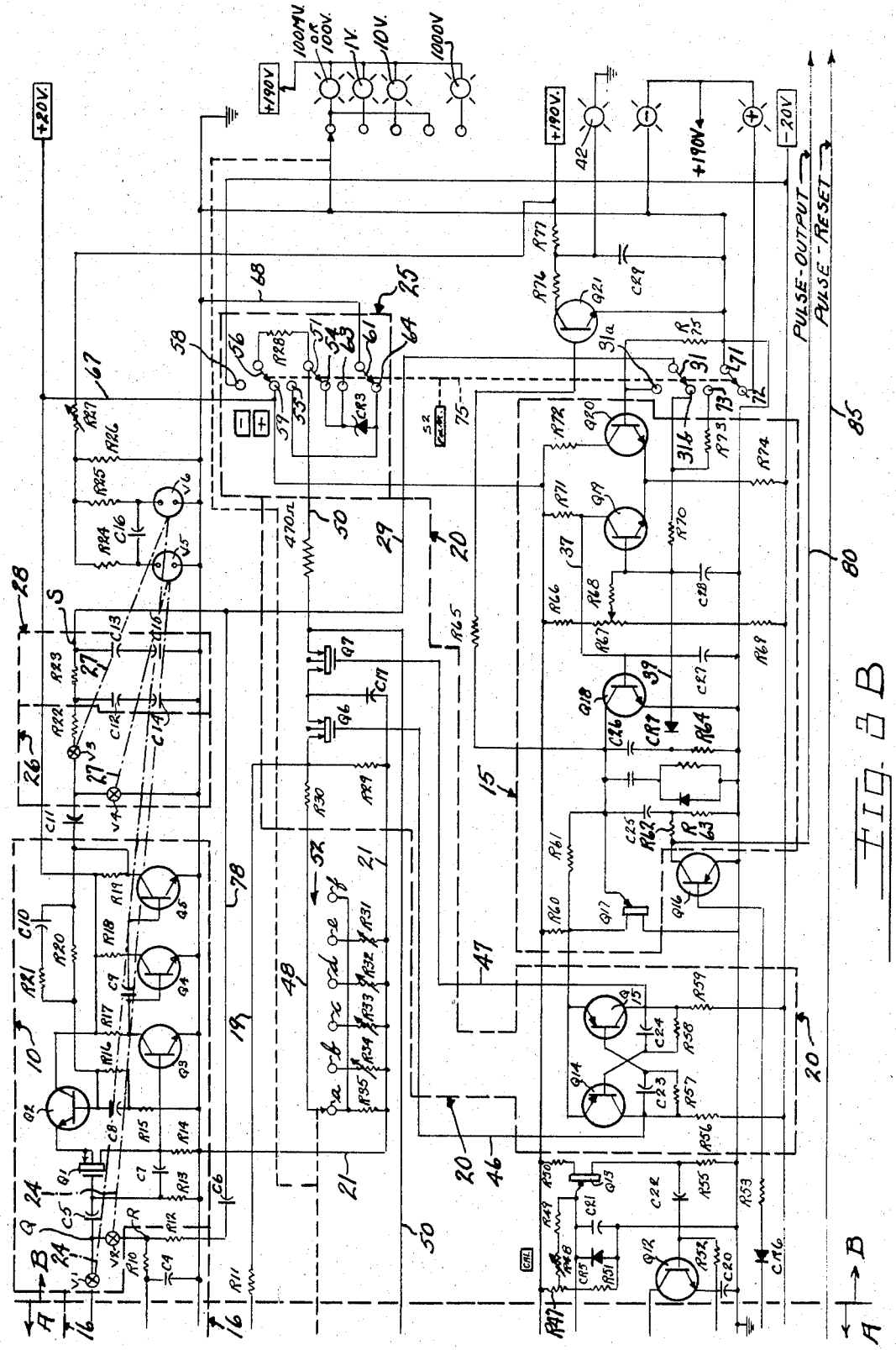

With reference now directed to FIGURE 1 the digital electronic circuit of the present invention, as shown in this simplified block diagram, is seen to include a direct current amplifier 10 to which the unknown direct current voltage $E_1$ to be measured and a direct current feedback voltage $E_2$ are applied; a direct current-to-frequency converter 15 whose input is connected to the output of the amplifier 10 and which receives a signal $E_{out}$ from said amplifier which signal is defined as $E_{out}=10^4 (E_1-E_2)$; a frequency-to-direct current converter 20, the output signal of this converter 20 being the voltage $E_2$ which is fed back to the input of amplifier 10.

$E_2$, the output voltage of converter 20, is a direct current voltage of the same polarity as $E_1$. The voltage difference $(E_1-E_2)$ is amplified in amplifier 10 and fed as output voltage $E_{out}$ to the input of the direct current-to-frequency converter 15. This converter 15 generates a pulse train as identified at waveform A whose pulse frequency is approximately proportional to the magnitude of the voltage $E_{out}$ fed to it. This pulse train is used to activate the frequency-to-direct current converter 20 which is a highly precise converter. The output signal $E_2$ of the frequency-to-direct current converter 20 is proportional to the product of a direct current reference voltage provided by a Zener diode circuit 25 and the frequency of pulse train A to within approximately ±0.01%. By making the gain of the difference amplifier 10 very high, such as for example to $10^4$ power, the voltage $E_2$ will be very nearly equal to voltage $E_1$ and consequently, the frequency of the pulse train A will be accurately held proportional to the magnitude of the direct current voltage $E_1$ under test to within a few parts in ten thousand.

A pulse burst identified as waveform B and having the correct number of pulses to digitally identify the magnitude of the voltage $E_1$ is obtained by opening a gate identified at 30 for a carefully controlled time. By keeping the time this gate is open constant, it can be seen that the number of pulses in a burst B will be directly proportional to the frequency of the pulse train A, which in turn is directly proportional to the voltage $E_1$. Thus, the number of pulses in pulse burst B will be precisely proportional to the magnitude of the direct current voltage $E_1$ under test.

A display time generator 35 generates a signal which is applied to a gate timer 38. The gate timer 38 provides an output reset pulse waveform D which is applied to "Reset" input terminal of the digital counter and display device as shown in FIGURE 4 whereby said device is reset to zero at the beginning of each counting cycle or period thus enabling said device to accurately count the pulses in the next succeeding pulse burst B. The gate timer 38 also generates a pulse of precise width, waveform C, the leading edge of which is slightly later in time with respect to pulse D and which pulse C is applied to gate 30 to open said gate for a predetermined time (100$^u$ sec.) and allow the pulse burst B to pass to the digital counter and display device, FIG. 4, said waveforms B and C being applied to the INPUT COUNT terminal of the digital counter and display device of FIG. 4 and totalized therein to provide a visual digital value of the magnitude of the voltage $E_1$.

With reference now directed to the complete block diagram of FIGURE 2 and its associated circuit schematic of FIGURES 3A and 3B, the electronic digital circuit of the present invention, in greater detail, includes an input attenuator circuit indicated generally at 12, which connects to the input terminal $T_1$ of the instrument and which in its present configuration is a conventional 9 megohm decade resistor $(R_2-R_7)$. Said resistors $(R_2-R_7)$ are selected for low temperature coefficient and preferably a value tolerance of ±1%.

The identity and value of each of said resistors $R_2-R_7$ plus the identity and value of each of the other components associated therewith in one embodiment of the digital electronic circuit of the present invention is hereinafter listed.

The unknown voltage $E_1$ to be measured is normally connected across the direct input terminals $T_1$ and $T_2$. Input terminal $T_7$ is identified as the ground terminal which is usually connected to the chassis (not shown) in which the circuitry is mounted.

In order to reduce input capacity of the instrument circuitry an additional one (1) megohm resistor $R_1$ is connected between the direct input terminal $T_1$ and said decade resistor in such manner that the input impedance of the digital circuit is ten (10) megohms on all of its ranges of operation.

A third input terminal $T_3$ is provided to accommodate a test probe (not shown). One such probe is identified as the Hickok probe No. 16970–83. This probe has an internal resistance of 1 megohm in order to prevent the source of the unknown voltage under test from introducing any errors into the digital analysis of said voltage.

A range switch 13 of conventional design is seen to have two rows of stationary contacts 13$a$, 13$b$, each row having six stationary contacts. A pair of movable contacts 13$c$, 13$d$ are adapted to be moved into selective engagement with one stationary contact in each row to connect the direct current voltage to be tested to the decade resistor of the attenuator circuit 12. For example, as shown in FIGURE 3A, movable contacts 13$c$, 13$d$ are in contact with the upper stationary contact in each row 13$a$, 13$b$ to connect the attenuator into its 100 millivolt range, whereby the unknown voltage $E_1$ is connected through $R_1$ and through movable contact 13$c$ to the resistor input of the digital instrument circuit. Said voltage $E_1$ is also shunted through resistor $R_6$, contact 13$d$, resistors $R_2-R_7$ to the ground terminal $T_2$ whereby said voltage signal $E_1$ is effectively attenuated.

Movable contacts 13$c$, 13$d$ may be similarly adjusted to selectively connect with successive pairs of stationary contacts 13$a$, 13$b$ to connect the attenuator 12 into its one (1) volt; ten (10) volt; one hundred (100) volt and thousand (1000) volt ranges.

The lowermost switch position of the range switch 13 is identified by the legend "Cal" as seen in FIG. 3A, and is used to connect a predetermined value of direct current reference voltage to the attenuator input to calibrate the instrument circuitry.

The attenuated direct current voltage from attenuator 12 may have an alternating current component is then applied by movable contact 13$c$ of the range switch 13 and conductor 14 to the input of an alternating current filter 16 which is connected across the input terminal P of the amplifier 10 and chassis ground. The instant digital circuitry is defined as a true integrating system and hence it is not required that all of the alternating current component be removed from the voltage under test. The purpose of the filter 16 is to attenuate or shunt a suitable portion of the alternating current components of the voltage under test to chassis ground sufficiently to prevent overloading and blocking of the high gain amplifier 10. If the alternating current component is still found to be excessive with the filter 16 functioning properly and it causes erratic operation of the circuitry, additional filtering of said component may be obtained by connecting a suitable capacitor, as for example 1 microfarad, from terminal $T_3$ to ground terminal $T_2$.

In order to further prevent overloading of the amplifier 10 by the voltage under test an overload protection circuit 18 is provided comprising a pair of silicon diodes CR1, CR2 (FIG. 3A) which are connected across the input terminals P, R, of the amplifier 10. In the event of voltage overload the excess voltage is shunted to chassis ground via conductor 19, resistor R11, resistor R29 and conductor 21, FIG. 3B. As shown the diodes CR1, CR2 are connected back-to-back with respect to each other as to be alternatingly conductive each half-cycle of the excessive alternating current component.

Depending upon the setting of the range switch 13 approximately only 0.6 volt direct current appears across the input terminals P, R of the amplifier 10. For example, if a 1000 volt direct current voltage signal is connected across terminals $T_1$ and $T_2$ with the range switch set for the 100 millivolt scale as is shown in FIG. 3A, approximately 730 volts direct current will appear across resistor R1, and both input terminals P, R, of amplifier 10 will rise about 100 volts direct current above the chassis ground.

The filtered signal output from filter 16 appears across the input terminals P, R of the amplifier 10 as a smooth direct current voltage, the magnitude of which is determined by the range switch 13.

As aforementioned, this voltage signal is identified as $E_1$ and is combined with a feedback voltage $E_2$ from the frequency-to-direct current converter 20 whereby the difference voltage signal $(E_1-E_2)$ is applied to the amplifier 10.

A chopper 17 comprising a pair of high speed photo resistors V1 and V2 are connected in series to each other and across the amplifier input terminals P, R, and function to change the direct-current signal input to the amplifier 10 into an alternating current signal.

The photo resistors V1 and V2 are optically coupled by any suitable light transmitting means, such as a lucite tubular pipe or the like which is diagrammatically indicated at 24 in FIG. 3B, to a neon tube multivibrator comprising neon tubes V5 and V6 and associated circuit components R24, R25 and C16.

As illustrated, the multivibrator V5, V6 is conventional in circuit configuration being connected across the chassis ground and a suitable voltage source as indicated at +190 volts. The multivibrator is an astable or a free running oscillator in operation, the frequency of oscillation thereof being determined, as will be understood, by variable load resistor R27. Shunt load resistor R26 connected across the multivibrator functions to establish the range of adjustment for the frequency control of resistor R27.

In the circuit configuration therefore as herein shown the preferred frequency of oscillation for the multivibrator V5, V6 is approximately 75 cycles per second to be insensitive to 60 cycle transients. With the multivibrator thus oscillating, neon tubes V5, V6 are alternately illuminated whereby the light emanating therefrom is transmitted by the aforementioned optical coupling 24 to, in turn, alternately activate the photo resistors V1, V2.

The alternate activation of resistors V1, V2 converts the input voltage signal $(E_1-E_2)$ across the amplifier input terminals P and R into a corresponding alternating current signal which is then coupled by capacitor C5 to the first stage of amplifier 10.

As shown in FIG. 3b, the amplifier 10 has four stages of amplification, the 2nd, 3rd, and 4th stages comprising conventional NPN transistor amplifiers $Q_3$, $Q_4$ and $Q_5$ respectively connected in cascade grounded emitter configuration. The first stage comprises a field effect transistor (FET) $Q_1$ used to provide the amplifier with a high impedance input, and which is direct coupled to the 2nd stage $Q_3$. As noted, the stages of amplifier 10 are direct coupled to each other. Transistor $Q_2$ and its associate circuitry provides suitable direct current feedback to amplifier stage $Q_1$ to effect stability. Likewise, as will be understood the resistor and capacitor network R20, R21, C10 respectively provide suitable alternating current feedback for the AC component which also enhances stability of the amplifier. With the component values identified herein, the gain of the amplifier 10 is approximately $3\times10^4$ $(E_1-E_2)$.

The signal output of amplifier 10 is coupled by capacitor C11 into a coherent demodulator 26 comprising photo resistors V3 and V4 which are also optically coupled to the multivibrator V5, V6 by suitable light transmitting means such as a lucite pipe or the like as schematically shown at 27.

The photo resistors V3, V4 function in the same manner as resistors V1, V2 to convert the alternating current signal output of the amplifier 10 into direct current of corresponding magnitude.

The direct current signal output from demodulator 26 is then applied to an integrator circuit 28 comprising resistor and capacitor filter components C12, C14, R23, C13 and C15, and which function to further smooth said demodulated direct current signal. The output signal of integrator circuit 28 appearing at point S FIG. 3B is approximately $10^4$ times greater than the magnitude of the voltage $(E_1-E_2)$ appearing across the input terminals P, R of the amplifier 10. The capacitor components C12, C13, C14 and C15 are preferably electrolytic capacitors since the output of the amplifier 10 is an alternating current signal, and as shown in FIG. 3B said filter components are connected back-to-back as to be responsive to said alternating current signal. As will be apparent, the polarity of the output signal from the integrator 28 is the same as the polarity of the input voltage $E_1$ under test.

The filtered direct current signal appearing at point S as shown in FIG. 3B is then applied by conductor 29 to the movable contact 31 of polarity switch S2 and thence by either associated stationary contact 31a, 31b to the input of a direct current to frequency converter identified in its entirety at 15.

This digital instrument circuitry will accept either a positive or negative going direct current voltage $E_1$ of unknown magnitude whereas the converter 15 in its present configuration will accept only positive going direct current voltage signals.

Consequently, the polarity switch S2 is used to selectively connect the output voltage signal from the integrator circuit 28, which may be either positive or negative going, and which is also the same polarity as the voltage $E_1$ under test, in the correct polarity sense to the converter 15. For this purpose, the input of the converter 15 comprises a conventional differential amplifier Q19, Q20 and associated circuit components which operates to invert a negative going signal from the integrator circuit 28 to a positive going signal. As shown in FIG. 3B, when the movable contact 31 of the polarity switch S2 is swung upwardly from the position depicted and into engagement with stationary contact 31a of said switch S2, a negative going signal is applied to the base electrode of transistor Q20 of the differential amplifier causing transistor Q19 to conduct heavily.

In like manner, with a positive going signal as the output of integrator 28, the polarity switch S2 is operated to the position shown in FIG. 3B whereby movable contact 31 engages stationary contact 31b. As a result, said signal is applied to the base electrode of transistor Q19 which causes said transistor to conduct heavily.

The resultant amplified signal output from the collector electrode of transistor Q19 is then applied by conductor 37 to the base electrode of transistor amplifier Q18 whereby the signal is further amplified.

The converter 15 also includes unijunction transistor Q17 which, with its associated circuitry, functions as an astable pulse generator. The frequency of oscillation of the pulse chain generated by pulse generator Q17, as will be understood, is determined by its timing capacitors C25 and C26 connected across its input circuit and the charging cycle of capacitor C28.

Feedback network comprising capacitor C26, resistor R64, diode CR7 and capacitor C28 connects the output of transistor amplifier Q18 back to the differential amplifier Q19, Q20. Capacitor C26 is substantially smaller than capacitor C25 as noted hereinafter and hence discharges sharply to generate a negative pulse which is rectified by diode CR7. The resulting negative direct current voltage pulse output from said diode CR7 is therefore proportional to the pulse repetition rate of the pulse generator Q17, and is used as a feedback voltage and fed back to the differential amplifier Q19, Q20. This feedback voltage is applied by conductor 39 to the upper end of capacitor C28 whereby to charge said capacitor negatively. As will be realized this effects to stabilize the frequency of operation of the direct current to frequency converter 15.

Assuming, as shown in FIG. 3B, that the instrument is set to measure a positive direct current voltage $E_1$ of known magnitude. As the signal output from integrator 28 is applied through movable contact 31 of the polarity switch S2 to the differential amplifier Q19, Q20, transistor Q19 is turned on and transistor Q18 is turned off. As a result unijunction transistor Q17 turns on to provide a pulse to the flip-flop circuit Q14, Q15.

When Q17 fires, capacitor C26 discharges to provide a negative pulse through diode CR7 to the upper end of capacitor C28 which then charges to this negative potential. The voltage level of base of transistor Q19 is also lowered by this negative potential thereby cutting off said transistor Q19.

When transistor Q19 is turned off this turns on Q18 which, in turn, prevents capacitor C25 from recharging.

The circuit remains in this state until the voltage signal from integrator 28 overcomes the negative charge on capacitor C28. When this occurs, the base potential of transistor Q19 is again raised whereby to turn on said transistor Q19. With transistor Q19 turned on, transistor Q18 is again turned off whereby the potential on the collector of Q18 and emitter electrode of unijunction transistor Q17 begins to rise toward +20 volts. This is delayed while capacitor C25 is charged whereupon the level of the potential of said emitter electrode is raised sufficiently to turn on unijunction transistor Q17 and as a result of the cycle is repeated. The time between cycles or the time between pulses and likewise the number of pulses in the signal output from transistor Q17 is thus dependent on the charging rate of capacitor C25 which in turn is dependent upon the charging rate of capacitor C28 which is governed by the resistance R70 and the magitude of the direct current input signal to the differential amplifier Q19, Q20.

If the polarity of the signal from the integrator circuit 28 is of one polarity, say positive going and the polarity switch S2 is actuated so that its movable contact 31 is in engagement with stationary contact 31a which may also be defined as the corresponding "negative signal stationary contact," the input to the differential amplifier Q19, Q20 is of the wrong polarity. If this happens, transistor Q18 will saturate or go into heavy conduction, which in turn, causes transistor Q17 to be disabled and transistor Q21 which is connected to the output of said said transistor amplifier Q18 to turn off. As seen in FIG. 3B, transistor Q21 is an NPN type connected in its grounded-emitter configuration, and has a lamp 42 connected between its collector circuit and chassis ground. The collector circuit is also seen to be connected to a suitable positive voltage source such as 190 volts direct current, through load resistors R76, R77, whereby as transistor Q21 is turned off, the voltage across lamp 42 increases to the point whereby said lamp turns on to indicate that the "wrong polarity" of signal is applied to differential amplifier Q19, Q20 thereby requiring the adjustment of switch S2 to place its movable contact 31 in the position shown in FIG. 3B or in engagement with stationary contact 31b the "positive signal stationary contact."

The polarity switch S2 is also provided with another movable contact 71 which is selectively engageable with stationary contacts 72, 73 which is effective to connect the emitter of transistor Q21 to chassis ground or to conductor 39 through resistor R73 respectively to provide proper bias to said transistor Q21.

The output signal from unijunction transistor Q17 of converter 17 is a negative going pulse which is applied to a flip-flop circuit of the frequency to direct current converter 20 which comprises transistors Q14 and Q15 connected at their output collector electrodes by conductors 46, 47 respectively, to the base electrodes of switching transistors Q6 and Q7.

With the application of said pulse signal from transistor generator Q17, flip-flop circuit Q14 and Q15 is alternately actuated to produce a square wave signal, as will be understood, the frequency thereof being one-half the frequency of said unijunction pulse signal of generator Q17.

The square wave pulse output of the flip-flop Q14, Q15 when applied to each base electrode of switching transistors Q6 and Q7 is effective to alternately fire said transistors Q6 and Q7.

As herein shown transistors Q6 and Q7 are each preferably metal-oxide silicon field effect transistors or Mosfet type as commonly called, so as to provide a relatively high input imepdance to the flip-flop circuit so as to be sufficiently insensitive to transient signals from the latter.

Transistor Q7 is seen to be connected by conductor 50 to the movable contact 51 of the polarity switch S2 and is also in series with switching transistor Q6.

The movable contact 51 of said switch S2 is seen to be manually adjustable as to selectively alternately engage stationary contacts 54, 55 of said switch S2.

Switch S2 is also provided with a movable contact 56 which is manually adjustable into selective engagement with either stationary contacts 58, 59, and a movable contact 61 which is likewise manually adjustable with contacts 51 and 56 into selective engagement with either stationary contact 63, 64. As shown said movable contacts 56, 51, 61, 31 and 71 may be "ganged" as commonly called by bar 75 whereby said contacts are actuated simultaneously to the position shown in FIG. 3B or the alternate thereto.

As aforementioned, a reference voltage such as is provided by a Zener diode circuit 25 is provided in the instant instrument circuitry and, as shown in FIG. 3B, it includes a Zener diode CR3 which is connected at its cathode to stationary contacts 55, 64 and at its anode to stationary contacts 54, 63 of said switch S2. Stationary contact 58 of said switch is connected by conductor 66 to a suitable source of negative direct current voltage such as −20 volts D.C. In like manner, stationary contact 59 is connected by conductor 67 to a +20 volt direct current voltage source. Movable contact 61 is also connected by conductor 68 to the chassis ground as shown.

With this circuit structure, and with the contacts of switch S2 in the position illustrated in FIG. 3B wherein the voltage signal output from the integrator 28 is positive going and the same polarity as the direct current voltage $E_1$ under test, a positive voltage of 20 volts is applied across Zener diode CR3 through conductor 67, contacts 56 and 51 and conductor 68 and contact 61. The breakdown voltage of diode CR3 which, as indicated in the component list included herein, is preferably a 1N823A type made by General Electric Company, may be in the neighborhood of 6.5 volts direct current, is applied to switch transistor Q7.

A capacitor C17 is connected across the common connected base electrodes of said transistors Q6, Q7 and conductor 21 which is identified in FIG. 3B as chassis ground.

Resistor R29 is also seen to be connected between one of the base electrodes of transistor Q6 and chassis ground or conductor 21. Resistor R30 is connected at its one end to the junction of resistor R29 and said base electrode of transistor Q6. The opposite end of resistor R30 is connected by conductor 48 to a wiper arm 49 of the range switch 13. Wiper arm 49 is positioned to be selectively moved into engagement with one of a series of stationary contacts (a–f) inclusive of range switch 13, to which, in turn trimmer resistors R35–R31 respectively are connected. As shown in FIG. 3B the opposite end of each of said trimmer resistors is likewise connected to chassis ground, conductor 21. Trimmer resistors R31–R34 are seen to be preferably adjustably whereas resistor R35 is a fixed magnitude, the value of each of which is listed hereinafter. The function of transistor Q7, when turned on, is to charge capacitor C17 to a voltage equal to that across the Zener diode CR3. The function of transistor Q6, when turned on, is to discharge capacitor C17 through resistors R29, R30 and the connected trimmer resistors R31–R35 of the range trimmer switch 13. The voltage generated by this cyclic charge and discharge of capacitor C17 is then integrated by resistor R11 and capacitor C4 connected to each other by conductor 19 to provide a direct current voltage which is then applied through resistor R10 to the input terminal point R of the amplifier 10.

When the instrument is initially turned on a direct current voltage also appears at point R, FIG. 3B that is proportional to the rate of change of the voltage appearing at point S. This is accomplished by passing the output signal from the integrator 28 by conductor 72 through capacitor C6 and resistor R12. The output signal from integrator 28 has an alternating current component, and this component is fed back through capacitor C6 and resistor R12 to assist in stabilizing the operation of the amplifier 10. As the instrument continues to operate the integrated direct current voltage resulting from the cyclic discharge of capacitor C17 constitutes the feed-back signal $E_2$ which is effective to provide stabilization of said amplifier 10. And, as the output of the amplifier 10 becomes stabilized to provide a signal $(E_1 - E_2)$ $10^4$ the alternating current component of this signal from integrator 28 is materially reduced whereby to cease being an effective feed-back signal at point R. The stabilizing time of the instrument circuitry may be several minutes.

A second signal output is taken from the pulse generator Q17, said signal comprising negative pulses which appear across resistor R63. As aforementioned the number of pulses in the signal output of generator Q17 is dependent upon the magnitude of the signal output from the integrator 28 which, in turn, is directly related to the input signal E under test to the amplifier 10.

This second signal output is applied through resistor R62 and conductor 80 to the input circuit. Schmitt trigger, of the counter and readout device or instrument identified in FIG. 4 which, as aforementioned is preferably a Hickok model DMS-3200 instrument. The pulses of this signal are totalized in said counter and readout device, the total number of said pulses equalling substantially the magnitude of the direct current voltage E, under test.

The manner in which the counter and readout device of FIGURE 4 is described in detail in the instruction manual published by the Hickok Electrical Instrument Company of Cleveland, Ohio and which is entitled Digital Measuring System—Main Frame DMS-3200 and therefore its operation need not be discussed herein in detail.

Suffice to say that input signals for count purposes are received by the input circuit of the instrument of FIGURE 4 which is a Schmitt trigger. Said signals are converted into standard fast-riding pulses, one output pulse for each incoming pulse. The Schmitt trigger pulses are fed to the unit's digit "odd-even" multivibrator which changes state for each incoming pulse. This multivibrator controls odd, even drivers which, in turn, provide high voltage to the "odd" or "even" pins of the neon readout tube. In addition, each time the "odd-even" multivibrator returns to the "even" state, the buffer amplifier and pulse shaper stage amplifies and shapes a pulse which is fed to the five-step ring counter.

For each incoming pulse from the buffer-shaper amplifier, the five stage ring counter steps one stage forward and on the sixth pulse returns to its original state. The ring counter controls the tube drivers which, in turn, control the neon readout tube.

The readout tube is a biquinary type neon display tube. This means that the tube consists of five sets of number pairs with an odd and an even number in each pair. By controlling the number pair pins of said readout tube a number pair to display can be chosen. Then by controlling the "odd" and "even" pins of said readout tube either the odd or the even number of the chosen number pair can be displayed, i.e., for a reading of 0 choose number 0–1 and "even" pin, thereby displaying 0.

As the five stage ring counter steps from the 8–9 number pair to the 0–1 number pair a pulse is provided to the interstage Buffer Amplifier-Pulse Shaper of the following stage, which, in turn, provides a pulse to the succeeding "odd-even" multivibrator.

For each five pulses to the first five stage ring counter one pulse is transferred to the succeeding section, which then functions in the same manner to display a digital value.

The overrange circuit is a multivibrator which is triggered when the 100's digit five stage ring counter steps from number pair 8–9 to number pair 0–1. This turns on the overrange indicator. A reset pulse is provided to the ring counters, "odd-even" multivibrators and overrange multivibrator by the generator Q13 through conductor 85. When a pulse is applied at this input the circuitry is set in such a state that all the readout tubes display a 0 and the overrange indicator is off.

The signal output of generator Q17 to the counter and readout instrument, FIGURE 4, is permitted to pass to the latter through conductor 80 as long as transistor Q16 is turned off and which transistor may be defined as the gating transistor 30.

When transistor Q16 is saturated, the signal output of generator Q17 appearing across resistor R63 is channeled through its emitter-collector electrodes to chassis ground.

The operation of gating transistor Q16 is controlled by a Set-Reset multivibrator comprising transistors Q9, Q10, Q11 and Q12 and associated circuitry, FIGURES 3A and 3B and which functions as a bistable multivibrator.

This multivibrator is "set" to one of its two stable states by a pulse from the display time generator 35 comprising unijunction transistor generator Q8, FIGURE 3A at a time interval that is determined by the setting of variable resistor R37 connected into its emitter circuit, and which setting hereof will be explained hereinafter in detail.

This multivibrator is "reset" to the other of its two stable operating states by a pulse from the gate time circuit comprising unijunction transistor generator Q13, FIGURE 3B, at a time interval determined by the setting of variable resistors R47 and R48 connected into its emitter circuit and which controls along with resistor R49 the charge-discharge cycle of capacitor C21.

During the time interval capacitor C21 is charging, gating transistor Q16 is not saturated and the signal output from transistor generator Q17 is passed to the counter and display instrument of FIGURE 4 wherein it is digitally totalized and displayed.

The frequency of operation of unijunction generator Q13 is determined by the setting of variable resistor R47, R48 which, in turn, in conjunction with resistors R49 and R50 determine the charging time of capacitor C21.

When capacitor C21 reaches its selected charge level it enables generator Q13 to turn on and reset multivibrator Q9–Q12 whereby a signal output from transistor Q10 is applied through conductor 83, diode CR6 to the base electrode of the gating transistor Q16. As a result, transistor Q16 is turned on to stop the accumulation of the signal output from generator Q17 in the counter and readout instrument of FIGURE 4.

During this disabling interval, the diodes CR4 and CR5 in the circuit of generator Q13 clamp the capacitor C21 to the voltage thereacross.

The multivibrator Q9–Q12, as above mentioned is "set" by a pulse from unijunction transistor generator Q8 which, in its present circuit configuration operates as a free-running oscillator. The cycle of operation of this oscillator Q8 is determined by the setting of variable resistor R37 which is connected across its base-emitter circuit to thereby control the charge-discharge time of capacitor C18.

When the unijunction generator Q13 is enabled to turn on after the charging of capacitor C21, the output signal therefrom flips or "resets" the multivibrator Q9–Q12 whereupon a signal from transistor Q10 is applied through said conductor 83 and permits transistor Q16 to saturate thus terminating the pulse count representing the voltage under test $E_1$.

The oscillator Q8 next generates a pulse which is applied through capacitor C19 to the base electrode of transistor Q9 effective to again flip or "set" multivibrators Q9–Q12 which, in turn, disables gating transistor Q16 to again permit the accummulation or count of the pulse signal representing the unknown voltage E, in said instrument of FIGURE 4.

The oscillator Q8 also provides a pulse signal such as shown at waveform D in FIGURE 1 which is applied through conductor 85, FIGURES 3A and 3B to the reset terminal of the counter and display instrument of FIGURE 4 so as to reset said instrument to zero just prior to it receiving the next subsequent pulse group output from transistor generator Q17, as for example as shown in waveform A in FIGURE 1 representing the unknown voltage $E_1$.

In this manner, the pulse signal or group output from generator Q17 is repetitively applied to the counter and display instrument and therein digitally counted and displayed.

If it is desired to have infinite display of the pulse group output from generator Q17, switch S3, as shown in FIGURE 3A, may be closed so as to disable the oscillator Q8, whereby the count and digital total will remain on the instrument of FIGURE 4 inasmuch as the negative reset pulse from said oscillator Q8 is eliminated.

As heretofore mentioned, the instant digital voltmeter has an operating range of from 0 to ± 1000 volts within an accuracy of 0.1%. In order to accommodate this wide range, the instrument circuitry may be switched by the range switch 13 selectively into one of five (5) ranges namely, .0 to 99.9 millivolts; .000 to .999 volts; 0.00 to 9.99 volts; 00.0 to 99.9 volts and 000. to 1000 volts.

In order that the instrument circuitry operate accurately over this wide range, it is calibrated in each of said ranges.

This is accomplished as follows:

The digital instrument circuitry of FIGURES 3A and 3B is energized by connecting the same to the power supplies as are noted therein, and conductors 80, 85 are connected respectively to the input count and reset terminals of the counter and display instrument of FIGURE 4.

The range switch is moved to its "Cal" or calibrate position whereby its movable contacts 13c and 13d engage the lowermost stationary contacts in rows 13c and 13b. In this position the output voltage of the Zener diode circuit 25 comprising diode CR3 is applied directly to the input of the amplifier 10 bypassing.

The digital reading on the counter and display instrument of FIGURE 4 is noted and may be recorded. As understood it represents the base or reference voltage for the instrument circuitry.

The range switch 13, FIGURE 3A, is next moved to its "100 millivolt" position whereby movable contact 13c engages the uppermost stationary contact in row 13a, as shown in FIGURE 3A, and movable contact 13d engages the uppermost contact in row 13b.

An exact 100 millivolt source of direct current voltage—laboratory standard—is then connected between the direct input terminal $T_1$ and chassis ground. With the range switch 13 in the position shown in FIGURES 3A and B, its movable contact 49 engages stationary contact $a$ of trimmer switch 13 so that resistor R35 is connected between said contact 49 and chassis ground.

Inasmuch as this constant known voltage source, representing $E_1$, is exactly 100 millivolts direct current, the amplified output of amplifier 10 which is $(E_1-E_2)$ $10^4$ will hence be substantially constant.

This constant voltage, when applied to the Direct Current to Frequency Converter 15 generates a pulse chain having substantially a single frequency and hence a predetermined number of pulses per unit of time. This pulse chain is then applied through conductor 80 to the counter and display instrument of FIGURE 4 where the same is noted.

As is understood, the number of pulses in the pulse train output from the direct current to frequency converter 15 is directly related to the direct current magnitude of the signal output of the amplifier 10. Likewise, as aforementioned, the switching frequency of transistors Q6 and Q7 of the frequency to direct current converter 20 and hence the charge-discharge cycle of capacitor C17 is also directly related to said pulse train, being exactly one-half the frequency of said train. And, with this direct relationship it will also be realized that the magnitude of the voltage discharge of capacitor C17 which, as aforementioned, is the feedback voltage $E_2$ is also directly related to the magnitude of the signal output of the amplifier 10, and hence to the voltage input $E_1$ to the amplifier.

The magnitude of the feedback voltage $E_2$ that is established by the discharge of capacitor C17 across the resistors R29, R30 and R35 is made to be very close to the voltage under test $E_1$. For example, with a voltage under test $E_1$ equalling 1.100 millivolts, the typical feedback voltage $E_2$ that is established by said circuitry equals 1.098 millivolts. In this manner, as aforementioned, the instant instrument circuitry is operable to digitally measure a direct current voltage with an accuracy to within a few parts in ten thousand. Also, as will now be realized, the switching frequency or cycle of the switching transistors Q6, Q7 is directly related to the magnitude of the direct current voltage $E_1$ under test, and the magnitude of the feedback voltage $E_2$ is directly related to the frequency or cycle of said switching transistors Q6, Q7.

The instrument circuitry is also calibrated using the constant voltage output of the Zener diode circuit 25 as the input voltage under test $E_1$. For this purpose the range switch 13, FIGURE 3A is moved to its "Cal" position to connect the constant output of the Zener diode circuit 25 through conductor 50 to the input of the amplifier 10 whereby to represent the voltage under test $E_1$. The amplified output of this voltage $(E_1-E_2)$ $10^4$ from amplifier 10 is then applied to the direct current to frequency converter 15 whereby it is converted to a pulse chain of substantially a single frequency and a predetermined number of pulses. This pulse chain is then applied through conductor 80 to the counter and display instrument of FIGURE 4 wherein the number of pulses in said chain on the digital magnitude of the voltage of the Zener diode circuit 25 is noted and recorded.

Thereafter, whenever the instrument is used the range switch 13 should be adjusted to said "Cal" position to determine if this Zener diode voltage is again noted. If said digital value is different, resistor R48 in the circuit of the gating transistor Q13 is adjusted until the indicated reading is identical with the previous reading. In this manner the accuracy of the instrument circuitry is referenced back to this Zener diode circuit voltage.

The resistor R37 is adjusted to establish the "set time period" for multivibrator Q9–Q12 which setting is such as to determine that the number of pulses permited to be transmitted to the counter and display instrument exactly equals the digital magnitude of the source voltage $E_1$ (100 millivolts).

The same calibration procedure is followed with a known source of direct current voltage-laboratory standard—for each of the remaining ranges for the instrument circuitry namely, the one (1) volt; ten (10) volt; one-hundred (100) volt and one-thousand (1000) volt ranges.

For this additional calibration procedure, the range switch is successively adjusted to move its contact 49 into engagement respectively with stationary contacts b–e whereby the selectively connect trimmer resistors R34–R31 across the contact 49 and chassis ground 21 and hence in the circuit of switching transistor Q6. Each of said resistors, as for example, resistor R33 with the range whereby to selectively connect trimmer resistors R34–resistors, as for example, resistor R33 with the range switch in the ten (10) volt range, is then adjusted so as to regulate the magnitude of feedback voltage $E_2$ that is fed back to the input of amplifier 10. The connected resistor is adjusted until the proper digital value of the known source of voltage $E_1$ is displayed in the counter instrument of FIGURE 4.

COMPONENT LIST

C=Capacitor  S=Switch
R=Resistor   V=Photocell
Q=Transistor

| Ref. No.: | Name and description |
|---|---|
| C1 | Capacitor, fixed, polyester film: 1 µf., 10%, 200 volts. |
| C2 | Same as C1. |
| C3 | Capacitor, fixed, polyester film: .22 µf., 10%, 200 volts. |
| C4 | Capacitor, fixed, polyester film: .47 µf., 10%, 200 volts. |
| C5 | Capacitor, fixed, polystyrene: 10,000 pf., 10%, 160 volts. |
| C6 | Capacitor, fixed, polyester film: .022 µf., 10%, 200 volts. |
| C7 | Capacitor, fixed, polystyrene: 100 pf., 10%, 160 volts. |
| C8 | Capacitor, fixed, electrolytic: 100 µf., 20%, 6 volts. |
| C9 | Capacitor, fixed, polystyrene: 330 pf., 10%, 160 volts. |
| C10 | Capacitor, fixed, polystyrene: 1000 pf., 10%, 160 volts. |
| C11 | Capacitor, phenolic dipped Mylar: 1.0 µf., 10%, 100 volts. |
| C12 | Same as C8. |
| C13 | Capacitor, fixed, electrolytic: 22 µf., 20%, 6 volts. |
| C14 | Same as C8. |
| C15 | Same as C13. |
| C16 | Capacitor, fixed, polyester film: .047 µf., 10%, 200 volts. |
| C17 | Same as C5. |
| C18 | Capacitor, fixed, electrolytic: Tantalum, 5.0 µf., 20%, 20 volts. |
| C19 | Same as C10. |
| C20 | Same as C16. |
| C21 | Capacitor, fixed, polycarbonate: .1 µf., 5%, 75 volts. |
| C22 | Same as C9. |
| C23 | Same as C9. |
| C24 | Same as C9. |
| C25 | Capacitor, fixed, polyester film: .0022 µf., 10%, 200 volts. |
| C26 | Capacitor, fixed, polystyrene: 470 pf., 10%, 100 volts. |

COMPONENT LIST—Continued

| Ref. No. | Name and description |
|---|---|
| C27 | Same as C18. |
| C28 | Same as C1. |
| C29 | Same as C6. |
| CR1 | Semi-conductor device: FDM1000 diode. |
| CR2 | Same as CR1. |
| CR3 | Semi-conductor device: IN823A Zener diode. |
| CR4 | Semi-conductor device: SS1113 diode. |
| CR5 | Same as CR4. |
| CR6 | Same as CR1. |
| CR7 | Same as CR1. |
| Q1 | Transistor: MOSFET. |
| Q2 | Transistor: (2N3397). |
| Q3 | Same as Q2. |
| Q4 | Same as Q2. |
| Q5 | Same as Q2. |
| Q6 | Transistor: MOSFET. |
| Q7 | Transistor: MOSFET. |
| Q8 | Transistor: Unijunction 2N2646. |
| Q9 | Same as Q2. |
| Q10 | Same as Q2. |
| Q11 | Same as Q2. |
| Q12 | Same as Q2. |
| Q13 | Transistor: Unijunction. |
| Q14 | Transistor: 2N3638. |
| Q15 | Same as Q14. |
| Q16 | Transistor: 2N3638. |
| Q17 | Same as Q8. |
| Q18 | Same as Q2. |
| Q19–Q20 | Transistor: Paired (2N3397). |
| Q21 | Transistor: A130-1, 130 v. |
| R1 | Resistor, fixed, metal film: 1 megohm, .1%, 1 watt. |
| R2 | Resistor, fixed, metal film: 900 ohms, ±.5%, ±10 p.p.m. to ±65 p.p.m. temp. coeff. |
| R3 | Resistor, fixed, metal film: 810K ohms, ±.5%, ±10 p.p.m. to ±65 p.p.m. temp. coeff. |
| R4 | Resistor, fixed, metal film: 81K ohms, ±.5%, ±10 p.p.m. to ±65 p.p.m. temp. coeff. |
| R5 | Resistor, fixed, metal film: 8.1K ohms, ±.5%, ±10 p.p.m. to ±65 p.p.m. temp. coeff. |
| R6 | Resistor, fixed, metal film: 4.05 megohms, ±.5%, 1 watt, ±10 p.p.m. to ±65 p.p.m. temp. coef. |
| R7 | Same as R6. |
| R8 | Resistor, fixed, composition: 220K ohms, 10%, ½ watt. |
| R9 | Same as R8. |
| R10 | Same as R8. |
| R11 | Resistor, fixed, composition: 150K ohms, 10%, ½ watt. |
| R12 | Resistor, fixed, composition: 470K ohms, 10%, ½ watt. |
| R13 | Resistor, fixed, composition: 10 megohms, 10%, ½ watt. |
| R14 | Resistor, fixed, composition: 10K ohms, 10%, ½ watt. |
| R15 | Resistor, fixed, composition: 47 ohms, 10%, ½ watt. |
| R16 | Resistor, fixed, composition: Selected. |
| R17 | Resistor, fixed, composition: 22K ohms, 10%, ½ watt. |
| R18 | Same as R17. |
| R19 | Resistor, fixed, composition: 4700 ohms, ohms, 10%, ½ watt. |
| R20 | Resistor, fixed, composition: 1.8 meg- 10%, ½ watt. |

COMPONENT LIST—Continued

| Ref. No.: | Name and description |
|---|---|
| R21 | Resistor, fixed, composition: 56K ohms, 10%, ½ watt. |
| R22 | Same as R19. |
| R23 | Resistor, fixed, composition: 39K ohms, 10%, ½ watt. |
| R24 | Resistor, fixed, composition: 100K ohms, 10%, ½ watt. |
| R25 | Same as R24. |
| R26 | Same as R24. |
| R27 | Resistor, variable, wire wound: 10K ohms, 20%, 2 watt. |
| R28 | Resistor, fixed, metal film: 1.78K ohms, 1%, ½ watt. |
| R29 | Resistor, fixed, metal film: 511 ohms, 1%, ½ watt. |
| R30 | Same as R28. |
| R31 | Resistor, variable, wire wound: 150 ohms, 20%, 2 watt. |
| R32 | Same as R31. |
| R33 | Same as R31. |
| R34 | Same as R31. |
| R35 | Resistor, fixed, metal film: 75 ohms, 1%, ½ watt. |
| R36 | Same as R14. |
| R37 | Resistor, variable, composition: 1 megohm, 20%, ½ watt. |
| R38 | Same as R24. |
| R39 | Resistor, fixed, composition: 1500 ohms, 10%, ½ watt. |
| R40 | Resistor, fixed, composition: 68 ohms, 10%, ½ watt. |
| R41 | Same as R14. |
| R42 | Resistor, fixed, composition: 270K ohms, 10%, ½ watt. |
| R43 | Same as R42. |
| R44 | Resistor, fixed, composition: 1000 ohms, 10%, ½ watt. |
| R45 | Same as R17. |
| R46 | Resistor, fixed, composition: 8200 ohms, 10%, ½ watt. |
| R47 | Same as R27. |
| R48 | Resistor, variable, composition: 25K ohms, 20%, ½ watt. |
| R49 | Resistor, fixed, composition: Value determined in production. |
| R50 | Same as R49. |
| R51 | Same as R11. |
| R52 | Same as R44. |
| R53 | Resistor, fixed, composition: 2200 ohms, 10%, ½ watt. |
| R54 | Same as R19. |
| R55 | Same as R40. |
| R56 | Resistor, fixed, composition: 47K ohms, 10%. |
| R57 | Same as R12. |
| R58 | Same as R12. |
| R59 | Same as R56. |
| R60 | Same as R39. |
| R61 | Resistor, fixed, composition: 12K ohms, 10%, ½ watt. |
| R62 | Same as R53. |
| R63 | Resistor, fixed, composition: 470 ohms, 10%, ½ watt. |
| R64 | Resistor, fixed, composition: 1800 ohms, 10%, ½ watt. |
| R65 | Resistor, fixed, composition: 68,000 ohms, 10%, ½ watt. |
| R66 | Resistor, fixed, composition: 82K ohms, 10%, ½ watt. |
| R67 | Same as R27. |
| R68 | Same as R24. |
| R69 | Same as R66. |
| R70 | Same as R17. |
| R71 | Same as R11. |
| R72 | Resistor, fixed, composition: 120K ohms, 10%, ½ watt. |
| R73 | Same as R46. |
| R74 | Same as R24. |
| R75 | Same as R17. |
| R76 | Same as R17. |
| R77 | Same as R56. |
| S1 | Switch: Rotary. |
| S2 | Switch: Rotary. |
| V1 | Photocell. |
| V2 | Same as V1. |
| V3 | Photocell. |
| V4 | Same as V3. |
| V5 | Lamp, neon: Selected NE2U. |
| V6 | Same as V5. |

What is claimed is:

1. A digital voltmeter comprising input circuit means for receiving a direct current test voltage of unknown magnitude,
   differential amplifier means having first and second input terminals for selective connection to the output of the input circuit means,
   polarity reversing switch means for connecting the output of the input circuit means to the first input terminal and the second input terminal to a reference potential or for connecting the output of the input circuit means to the second input terminal and the first input terminal to a source of reference potential.
   first converter means connected to said amplifier means being operable to convert a first direct current signal from said amplifier means into a pulsating signal having a frequency that is proportional to the magnitude of said first direct current signal,
   second converter means connected to said first converter means including,
   circuit means responsive to said pulsating signal effective to provide a first generated signal having a frequency that is one-half the frequency of said pulsating signal,
   switch means alternately actuatable by said generated signal,
   switch means alternately actuatable by said generated signal,
   impedance means connected to said switch means and cyclically actuated thereby to provide a second generated signal which is one-half the frequency of said pulsating signal,
   means for integrating said second generated signal to provide a second direct current signal,
   second circuit means for connecting said second direct current signal to said input circuit means in opposition to said test voltage effective to provide therebetween a difference signal which is applied to said amplifier means,
   said amplifier means being operable to amplify said difference signal to provide said first direct current signal to said first converter means,
   and output circuit means for connecting said pulsating signal to a digital counter for totalizing the pulsations of said pulsating signal per unit of time.

2. A digital voltmeter as is defined in claim 1 and wherein the gain of the amplifier means is of such magnitude that the second direct current signal is very nearly equal to the first direct current signal.

3. A digital voltmeter as defined in claim 1 and wherein the circuit means in said second converter means comprises a flip-flop circuit responsive to the pulsating signal to provide a first generated signal having a frequency that is one-half the frequency of said pulsating signal.

4. A digital voltmeter as defined in claim 1 and wherein the switch means in said second converter means includes a plurality of transistor means and impedance means connected therebetween, said transistor means being alternately actuated by the first generated signal to cyclically actuate said impedance means.

5. A digital voltmeter as defined in claim 4 and wherein the impedance means comprises capacitor means connected between the transistor means and which is cyclically charged and discharged thereby to provide said second generated signal.

References Cited

UNITED STATES PATENTS

| | | | |
|---|---|---|---|
| 2,497,961 | 2/1950 | Shaw | 324—115 XR |
| 3,041,535 | 6/1962 | Cochran | 324—118 |
| 3,064,193 | 11/1962 | Grubb et al. | 324—120 |
| 3,159,787 | 12/1964 | Sexton et al. | 324—99 |
| 3,201,781 | 8/1965 | Holland | 324—120 XR |
| 3,327,229 | 6/1967 | Huelsman | 324—120 XR |

RUDOLPH V. ROLINEC, Primary Examiner

E. F. KARLSEN, Assistant Examiner

U.S. Cl. X.R.

324—120